Sept. 20, 1955 T. L. HEATON 2,718,089
TRAP AND BAIT DISPENSER
Filed Nov. 16, 1953
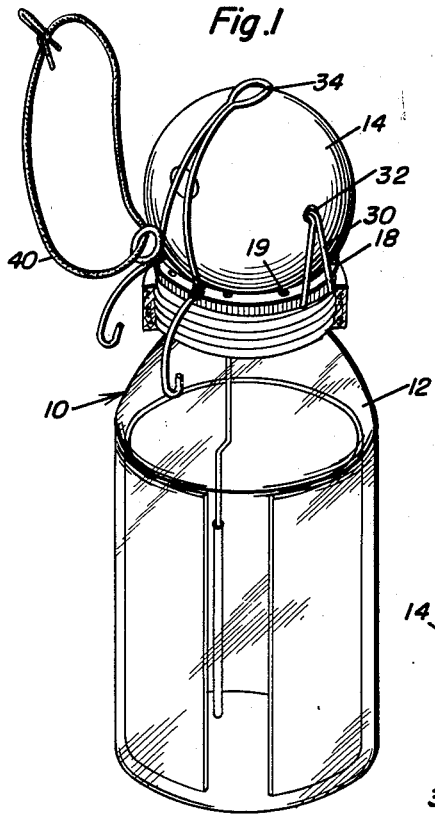
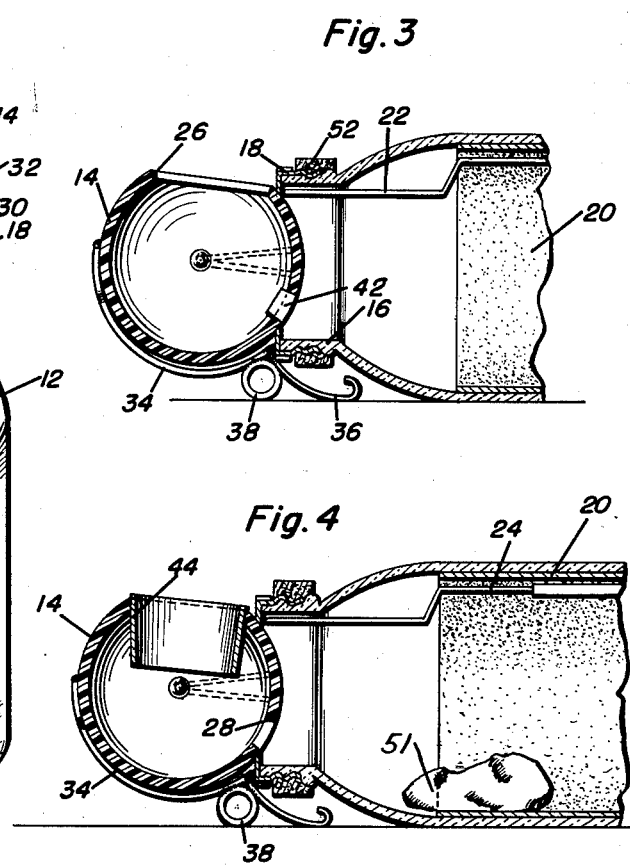
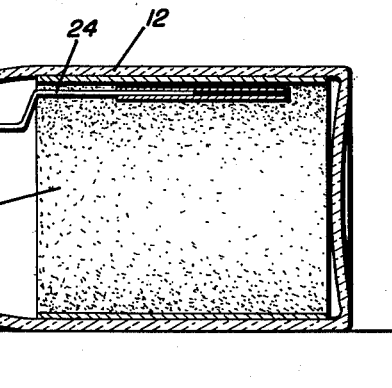
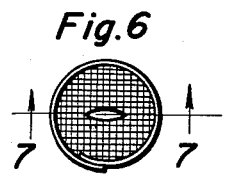
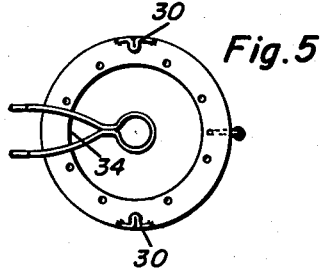
Thomas L. Heaton
INVENTOR.

United States Patent Office 2,718,089
Patented Sept. 20, 1955

2,718,089

TRAP AND BAIT DISPENSER

Thomas L. Heaton, Blytheville, Ark.

Application November 16, 1953, Serial No. 392,154

3 Claims. (Cl. 43—55)

This invention relates to a bait dispenser, and more specifically provides a receptacle for retaining insects and means for trapping the insects therein.

An object of this invention is to provide a bait dispenser having a receptacle for retaining insects and bait therein and a second smaller receptacle forming a closure for the bait receptacle wherein the second receptacle may be rotated to provide access into the interior of the bait receptacle.

Another object of this invention is to provide a bait dispenser having a roughened interior surface wherein the insects may climb around the interior of the dispenser, thereby avoiding the crowding of the insects.

A further object of this invention is to provide a bait dispenser wherein the insects trapped on the interior thereof may be easily dispensed for use without the escape of the insects remaining in the dispenser.

Yet another object of this invention is to provide a bait dispenser having means for supporting the mouth thereof in spaced relation to the ground surface and also having means for securing the dispenser to a convenient supporting object.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a perspective elevational view of the bait dispenser of this invention;

Figure 2 is a longitudinal, vertical section taken substantially along the center line of the bait dispenser of Figure 1 showing the bait dispenser in reclined position;

Figure 3 is a detail section similar to Figure 2 with the bait dispenser in such a position as to retain the insects therein;

Figure 4 is a detail section similar to Figure 3 showing the bait dispenser in use as an insect trap;

Figure 5 is an end view of the bait dispenser showing the hinge means and the friction producing means;

Figure 6 is a top plan view of a modification of the insert used in the secondary receptacle when the device is used as a bait trap; and Figure 7 is a longitudinal, vertical section taken substantially along section line 7—7 of Figure 6 showing the detail constructions of the insert member.

Referring now specifically to the drawings, it will be seen that the bait dispenser of this invention is generally denoted by the numeral 10 and generally includes a main receptacle 12 and a secondary receptacle 14. The main receptacle 12 is generally elongated and includes a mouth portion 16 which receives a conventional metal closure member 18 having vent openings 19. The metal closure member 18 is cut away, forming an opening into the interior of the main receptacle 12. A lining 20 is provided partially around the interior of the main receptacle 12, and the lining forms a partial roughened surface on the interior of the receptacle 12 wherein insects may crawl around the interior of the receptacle 12 without crowding down into one corner with resultant suffocating.

As shown in Figure 3, an elongated spring rod 22 is secured to the interior of the top member 18 and includes a horizontally extending portion 24 for rotation with the top 18 for detaching insects from the roughened surface 20 by moving the insects to the smooth surface. The secondary receptacle 14 is generally spherical in shape and includes an enlarged opening 26 and a smaller opening 28 angularly spaced from the enlarged opening 26. A pair of upstanding brackets 30 are secured in opposite relation on the top 18 and include inturned end portions for engaging an inwardly extending socket 32 on opposite ends of a diameter of the receptacle 14 wherein the receptacle 14 may pivot about an axis perpendicular to the longitudinal axis of the receptacle 12 and spaced from the upper end of the receptacle 12. A substantially semicircular wire member 34 is secured to the top 18 and extends around a portion of the periphery of the receptacle 14 and imparts frictional resistance to the receptacle 14 wherein the receptacle 14 will remain in an adjusted position. Further, a pair of prop members 36 are secured to the top member 18 at the ends of the wire member 34 and these prop members engage the ground surface when the receptacle 12 is positioned in a reclining position, wherein the mouth 16 of the receptacle 12 and the second receptacle 14 are spaced from the supporting surface. A loop member or eye member 38 is secured to the wire member 34 and one of the prop members 36 for receiving a flexible supporting cord 40 wherein the bait dispenser 10 may be supported from any convenient supporting member, such as a person's belt or the like.

It will be seen that a small stopper 42 is provided for closing the aperture 28 in the secondary receptacle 14, and a substantially cylindrical member 44 is positioned in the opening 26 wherein the cylindrical member 44 forms a reentrant flange for the opening 26, thereby permitting insects to proceed into the interior of the receptacle 14 and preventing the insects from crawling back out of the aperture 26. As shown in Figures 6 and 7, a semi-spherical screen member 46 having a slot 48 in the bottom thereof and a tubular attaching portion 50 at the top end thereof may be inserted in the aperture 26 for the same purpose as the cylindrical member 44. Suitable bait 51 may be positioned in the interior of the receptacle 12 wherein insects are attracted through the openings 26 and 28 into the interior of the receptacle 12.

The device is used as a bait trap when the stopper 42 is removed from the aperture 28 and the cylindrical member 44 placed in the aperture 26 and the apertures 26 and 28 orientated as shown in Figure 4, with the bait 51 on the interior of the receptacle 12. The exterior of the secondary receptacle 14 is smooth and a roughened member 52 is provided around the top of the receptacle 12, the roughened surface 52 may be secured to the top 18 in any conventional manner, and it will be seen that the insects may easily find their way to the interior of the receptacle 12. When the desired number of insects are trapped, the stopper 42 may be inserted in the small opening 28 in the secondary receptacle 14, and the flange or cylindrical member 44 may be removed from the opening 26 with the openings arranged substantially as shown in Figures 1 and 2. When it is desired to remove an insect from the interior of the receptacle 12, a single insect is shaken down into the interior of the secondary receptacle 14 wherein the secondary receptacle 14 is rotated about its pivot axis until the enlarged aperture 26 is open to the atmosphere. A person may then insert his finger into the interior of the secondary receptacle 14 and remove the insect as desired. It will be understood that the interior of the secondary receptacle 14 is very smooth, thereby preventing the insects from crawling up around the sides and out through the opening 26. Obviously, the receptacles may be made of any particular material, and in this specific embodiment, the receptacle 12 is of a transparent glass and the receptacle 14 is smooth on the outside and is generally spherical and transparent. Obviously, the receptacle 12 may be of any suitable shape, as may become necessary, and the secondary receptacle 14 may be any suitable shape, such as a small tin can or the like.

Since numerous modifications and changes will readily occur to those skilled in the art, it is not desired to limit the invention to the exact construction shown and described, and accordingly, all suitable modifications and equivalents may be resorted to, falling within the scope of the appended claims.

What is claimed as new is as follows:

1. A bait dispenser comprising a main receptacle having a mouth, an annular member threadedly mounted on said receptacle and surrounding said mouth, a pair of brackets on opposite sides of said annular member outwardly of said mouth, a secondary receptacle of spherical shape rotatable on said brackets between the same and extending part way into said mouth through an opening formed in said member to close said mouth, said secondary receptacle having a large and a small opening formed therein and angularly disposed around the same and separate from each other and rotatable by rotation of said secondary receptacle to selectively position either in communication with said mouth and the other outwardly of said mouth for opening said secondary receptacle to the atmosphere, and means on said annular member frictionally engaging said secondary receptacle and yieldingly opposing rotation of said secondary receptacle.

2. A bait dispenser according to claim 1, and means for closing at will one of said openings when positioned outwardly of said mouth.

3. A bait dispenser according to claim 1 said means comprising an arcuate wire member curving over said secondary receptacle.

References Cited in the file of this patent

UNITED STATES PATENTS

| | | |
|---|---|---|
| 1,265,481 | Mosby | May 7, 1918 |
| 1,762,030 | Ratty | June 3, 1930 |
| 2,127,389 | Church | Aug. 16, 1938 |
| 2,490,180 | Varnedoe | Dec. 6, 1949 |
| 2,579,549 | Cave | Dec. 25, 1951 |